US012530964B2

(12) United States Patent
Sugiura et al.

(10) Patent No.: US 12,530,964 B2
(45) Date of Patent: Jan. 20, 2026

(54) IDENTIFICATION SYSTEM

(71) Applicant: TOYOTA JIDOSHA KABUSHIKI KAISHA, Toyota (JP)

(72) Inventors: Tetsuro Sugiura, Chofu (JP); Nobutsugu Maruiwa, Mishima (JP); Tatsuya Sugano, Shizuoka-ken (JP); Soichiro Oura, Chofu (JP); Hiroya Chiba, Fuji (JP); Ryuji Okamura, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/753,657

(22) Filed: Jun. 25, 2024

(65) Prior Publication Data

US 2025/0006049 A1 Jan. 2, 2025

(30) Foreign Application Priority Data

Jun. 28, 2023 (JP) ................................. 2023-105958

(51) Int. Cl.
*G08G 1/017* (2006.01)

(52) U.S. Cl.
CPC .................................... *G08G 1/017* (2013.01)

(58) Field of Classification Search
CPC .......... G08G 1/017; G08G 1/04; G08G 1/143; G08G 1/146
See application file for complete search history.

(56) References Cited

U.S. PATENT DOCUMENTS

2019/0219680 A1* 7/2019 Sugae ..................... G01S 11/16
2023/0368668 A1 11/2023 Wada et al.

FOREIGN PATENT DOCUMENTS

JP 5947440 B1 7/2016
WO 2022/163025 A1 8/2022

* cited by examiner

*Primary Examiner* — Daryl C Pope
(74) *Attorney, Agent, or Firm* — Dinsmore & Shohl LLP

(57) ABSTRACT

The identification system includes a vehicle and an infrastructure device installed in a predetermined area. A first device that is one of the vehicle and the infrastructure device includes an output device configured to output an electromagnetic wave or a sound wave that is not for wireless communication. The second device that is another of the vehicle and the infrastructure device, includes a receiving device configured to receive the electromagnetic wave or the sound wave output from the output device of the first device. The first device is configured to output the electromagnetic wave or the sound wave modulated to indicate an identification code of the first device from the output device. The second device is configured to identify the first device based on the identification code indicated by the electromagnetic wave or the sound wave received via the receiving device.

6 Claims, 6 Drawing Sheets

IDENTIFICATION SYSTEM

CROSS-REFERENCE TO RELATED APPLICATION

This application claims priority to Japanese Patent Application No. 2023-105958 filed on Jun. 28, 2023, the entire contents of which are incorporated by reference herein.

TECHNICAL FIELD

The present disclosure relates to a technique for identifying a vehicle. The present disclosure also relates to a technique for identifying a predetermined area used by a vehicle.

BACKGROUND ART

Patent Literature 1 discloses a control device used in an automatic valet parking lot. The control device performs wireless communication with a vehicle which is about to enter the parking area and receives characteristic information and identification information of the vehicle.

LIST OF RELATED ART

Patent Literature 1: WO 2022/163025

SUMMARY

The process described in Patent Literature 1 cannot be executed in an area where a wireless communication service is not provided.

An object of the present disclosure is to provide a technique capable of identifying a vehicle or a predetermined area without using wireless communication.

One aspect of the present disclosure relates to an identification system.

The identification system includes a vehicle and an infrastructure device installed in a predetermined area.

A first device that is one of the vehicle and the infrastructure device includes an output device configured to output an electromagnetic wave or a sound wave that is not for wireless communication.

The second device that is another of the vehicle and the infrastructure device, includes a receiving device configured to receive the electromagnetic wave or the sound wave output from the output device of the first device.

The first device is configured to output the electromagnetic wave or the sound wave modulated to indicate an identification code of the first device from the output device.

The second device is configured to identify the first device based on the identification code indicated by the electromagnetic wave or the sound wave received via the receiving device.

According to the present disclosure, the first device includes the output device configured to output the electromagnetic wave or the sound wave that is not for wireless communication. On the other hand, the second device includes the receiving device configured to receive the electromagnetic wave or the sound wave output from the output device of the first device. The first device outputs the electromagnetic wave or the sound wave modulated to indicate the identification code of the first device from the output device. The second device is configured to identify the first device based on the identification code indicated by the electromagnetic wave or the sound wave received via the receiving device. Accordingly, the first device (the vehicle or the infrastructure device) can be identified without using wireless communication.

DETAILED DESCRIPTION

Embodiments of the present disclosure will be described with reference to the accompanying drawings.

1. First Embodiment

Figure 1:
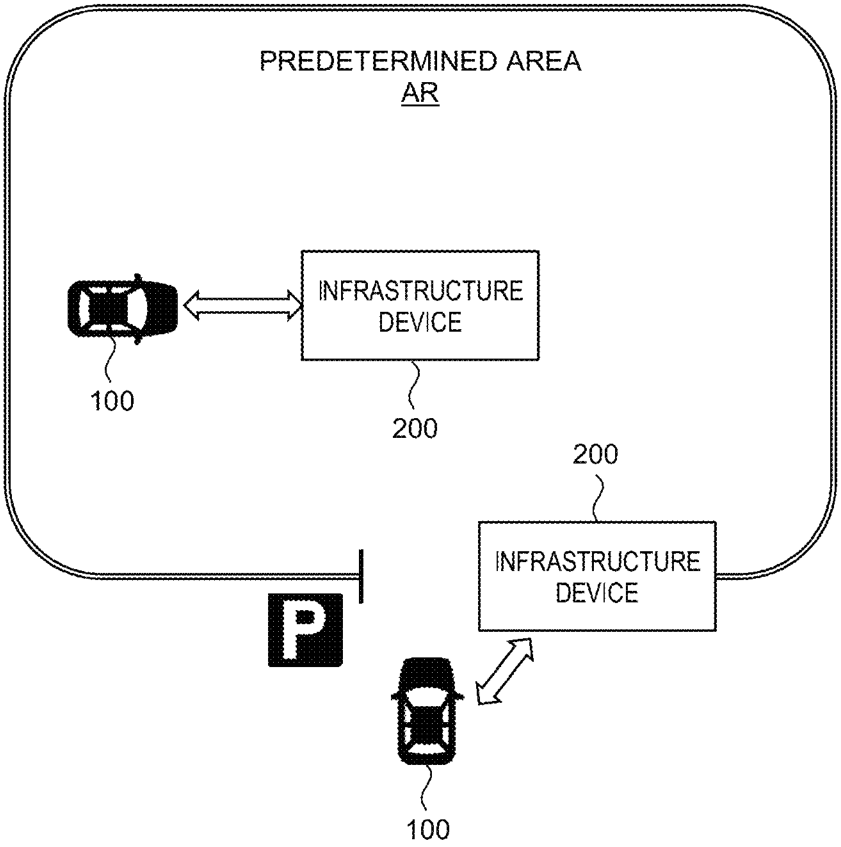
FIG. 1 is a conceptual diagram for explaining a vehicle and a predetermined area.

FIG. 1 is a conceptual diagram for explaining a vehicle 100 and a predetermined area AR. The predetermined area AR is an area used by the vehicle 100. The vehicle 100 enters and leaves the predetermined area AR, travels in the predetermined area AR, and parks in the predetermined area AR. Examples of the predetermined area AR include a parking lot, a site of a factory, a town, etc. When the predetermined area AR is a parking lot that provides an automatic valet parking service, the vehicle 100 may have an automatic valet parking function. The vehicle 100 may be an autonomous driving vehicle.

An infrastructure device 200 is installed in the predetermined area AR. The infrastructure device 200 may be installed at an entrance of the predetermined area AR. The infrastructure device 200 is associated with the predetermined area AR and is in charge of at least a part of management of the predetermined area AR.

For example, the infrastructure device 200 identifies the vehicle 100 that uses the predetermined area AR. In the present specification, "identifying" is a concept including "authenticating". For example, the infrastructure device 200 is installed at the entrance of the predetermined area AR, and identifies (authenticates) the vehicle 100 that is about to enter the predetermined area AR. As another example, the infrastructure device 200 may identify the vehicle 100 to be a target when the vehicle 100 parked in the predetermined area AR is operated remotely.

As an example, a case where the predetermined area AR is a parking lot that provides an automatic valet parking service will be considered. The infrastructure device 200 is installed at the entrance of the parking lot. The user of vehicle 100 designates a parking lot and requests use of the automatic valet parking service in the parking lot. When vehicle 100 arrives at the entrance of the parking lot, the user gets off vehicle 100. At the entrance of the parking lot, the infrastructure device 200 checks whether the vehicle 100 is actually the target of the requested automatic valet parking service. That is, at the entrance of the parking lot, the infrastructure device 200 identifies and authenticates the vehicle 100. After the authentication of the vehicle 100, the infrastructure device 200 instructs the vehicle 100 to start automatic valet parking. The infrastructure device 200 may guide the vehicle 100 to the assigned parking space.

The target of identification is not limited to the vehicle 100. Conversely, the vehicle 100 may identify the predetermined area AR (the infrastructure device 200). For example, vehicle 100 identifies the predetermined area AR to confirm whether the predetermined area AR is an area available by vehicle 100. In the following description, "identifying the predetermined area AR" and "identifying the infrastructure device 200 associated with the predetermined area AR" are considered to be equivalent.

An identification system 1 according to the present embodiment includes the vehicle 100 and the infrastructure device 200 installed in the predetermined area AR. The identification system 1 executes "identification process" for identifying the vehicle 100 or the predetermined area AR (the infrastructure device 200).

Figure 2:
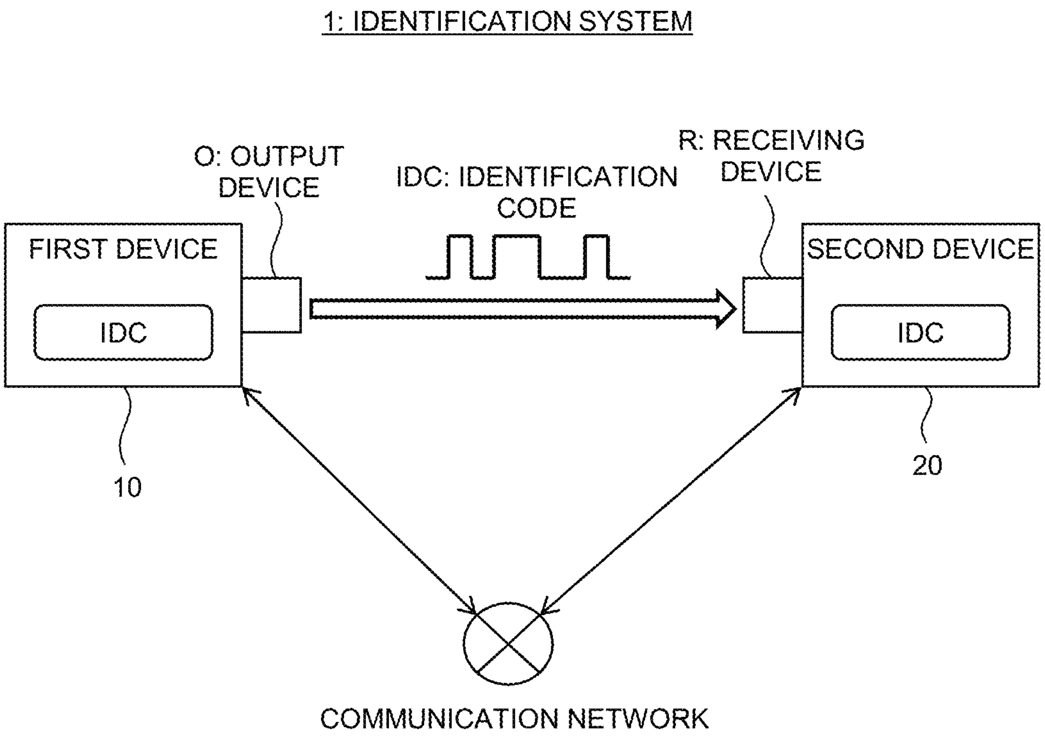
FIG. 2 is a conceptual diagram for explaining an identification system and identification process according to a first embodiment.

FIG. 2 is a conceptual diagram for explaining the identification system 1 and the identification process according to the embodiment. "A first device 10" is one of the vehicle 100 and the infrastructure device 200, and "a second device 20" is the other of the vehicle 100 and the infrastructure device 200. The first device 10 is a target of identification. An identification code IDC is identification information for identifying the first device 10. The identification code IDC may also serve as authentication information for authenticating the first device 10.

The first device 10 includes an output device O. The output device O outputs an electromagnetic wave or a sound wave which is not for wireless communication. In other words, the output device O transmits the electromagnetic wave or the sound wave without connecting to a communication network (e.g., a wireless local area network (LAN), a 5G network, or a long term evolution (LTE) network).

For example, the output device O is a distance measuring sensor. The distance measuring sensor outputs the electromagnetic wave or the sound wave, and receives a reflected wave thereof, thereby detecting an object in the surroundings and measuring a distance to the detected object. Examples of the ranging sensor include a radar, a light detection and ranging (LIDAR), an infrared sensor, and a sonar. Examples of the electromagnetic wave include a radio wave, a laser beam, and an infrared ray. The sound wave is exemplified by an ultrasonic wave. The function of the distance ranging sensor that outputs the electromagnetic wave or the sound wave in this way is used as the output device O.

As another example, the output device O may have only a function of outputting an electromagnetic wave or a sound wave. For example, the output device O includes an antenna that emits radio wave and a transmitter (Tx). As another example, the output device O may include a laser diode that emits laser light. As still another example, the output device O may be a light source (e.g., a headlamp, a hazard lamp, etc.) that emits visible light. As still another example, the output device O may include a piezoelectric element that outputs a sound wave. As yet another example, the output device O may include a horn.

On the other hand, the second device 20 includes a receiving device R. The receiving device R can receive the electromagnetic wave or the sound wave output from the output device O. In other words, the receiving device R can receive the electromagnetic wave or the sound wave output from the output device O without connecting to the communication network (e.g., wireless local area network (LAN), 5G, or long-term evolution (LTE)).

For example, when the output device O outputs the radio wave, the receiving device R includes the antenna and the receiver (Rx) to receive the radio wave. As another example, when the output device O outputs laser light, the receiving device R may include a photodetector (e.g., a photodiode) that receives the laser light. As still another example, when the output device O outputs the sound wave, the receiving device R may include the piezoelectric element that receives the sound wave.

As another example, the receiving device R may be the distance measuring sensor. When the output device O is the distance measuring sensor, the receiving device R may be the same type of distance measuring sensor as the output device O. The function of a distance measuring sensor for receiving the electromagnetic wave or the sound wave is used as the receiving device R.

The identification process for identifying the first device 10 is as follows. The first device 10 acquires in advance an identification code IDC for identifying the first device 10. For example, the identification code IDC is represented by a numerical string. The identification code IDC may be fixed for each of the first device 10 or may be issued temporarily.

The first device 10 outputs the electromagnetic wave or the sound wave of a pattern corresponding to the identification code IDC from the output device O. In other words, the first device 10 outputs the electromagnetic wave or the sound wave modulated to indicate the identification code IDC from the output device O. A modulation scheme is not particularly limited. Examples of the modulation scheme include on-off-keying (OOK) modulation, amplitude modulation, frequency modulation, phase modulation, pulse modulation, and pulse width modulation.

For example, the first device 10 generates the electromagnetic wave or the sound wave representing the identification code IDC by on-off-keying modulation. In this case, the first device 10 intermittently generates pulses of the electromagnetic wave or the sound wave and expresses the identification code IDC by ON/OFF of the pulses. For example, a pulse ON is associated with data "1", and a pulse OFF is associated with data "0". The identification code IDC is represented by an ON/OFF pattern of the pulses in a certain period.

As another example, the first device 10 may generate the electromagnetic wave or the sound wave representing the identification code IDC by the pulse width modulation. In this case, the first device 10 intermittently generates pulses of the electromagnetic wave or the sound wave and changes the pulse width in accordance with a data value. The identification code IDC is represented by a group of pulses in a certain period.

The second device 20 receives the electromagnetic wave or the sound wave output from the output device O of the first device 10 via the receiving device R. Further, the second device 20 demodulates the electromagnetic wave or the sound wave received via the receiving device R to acquire the identification code IDC. That is, the second device 20 reads the identification code IDC indicated by the electromagnetic wave or the sound wave received via the receiving device R. The second device 20 identifies the first device 10 based on the acquired identification code IDC.

The second device 20 may acquire the identification code IDC of the first device 10 to be identified in advance and hold the identification code IDC in a memory device. In this case, the second device 20 identifies the first device 10 based on the identification code IDC indicated by the received electromagnetic wave or sound wave and the identification code IDC held therein. For example, the second device 20 compares the received identification code IDC with the identification code IDC held therein. If the two correspond to each other, the second device 20 can identify (authenticate) the first device 10.

<Effects>

As described above, according to the present embodiment, the first device 10 includes the output device O that outputs the electromagnetic wave or the sound wave that is not for wireless communication. On the other hand, the second device 20 includes the receiving device R that receives the electromagnetic wave or the sound wave output from the output device O of the first device 10. The first device 10 outputs the electromagnetic wave or the sound wave modulated to indicate the identification code IDC of the first device 10 from the output device O. The second device 20 identifies the first device 10 based on the identification code IDC indicated by the electromagnetic wave or the sound wave received via the receiving device R. Thus, the first device 10 (the vehicle 100 or the infrastructure device 200) can be identified without using wireless communication. The recognition process according to the present embodiment can be employed even in an area where a wireless communication service is not provided.

The electromagnetic wave output from the output device O may be other than visible light. In this case, even in the daytime, the receiving device R can accurately detect the electromagnetic wave output from the output device O. This contributes to improvement in accuracy of the identification process. In addition, in the case of light other than visible light, it is possible to prevent surrounding people from feeling glare.

The sound wave output from the output device O may be an ultrasonic wave. In this case, even in a noisy environment, the receiving device R can accurately detect the sound wave output from the output device O. This contributes to improvement in accuracy of the identification process. In addition, in the case of the ultrasonic wave, it is possible to prevent surrounding people from feeling annoyance.

2. Second Embodiment

Figure 3:
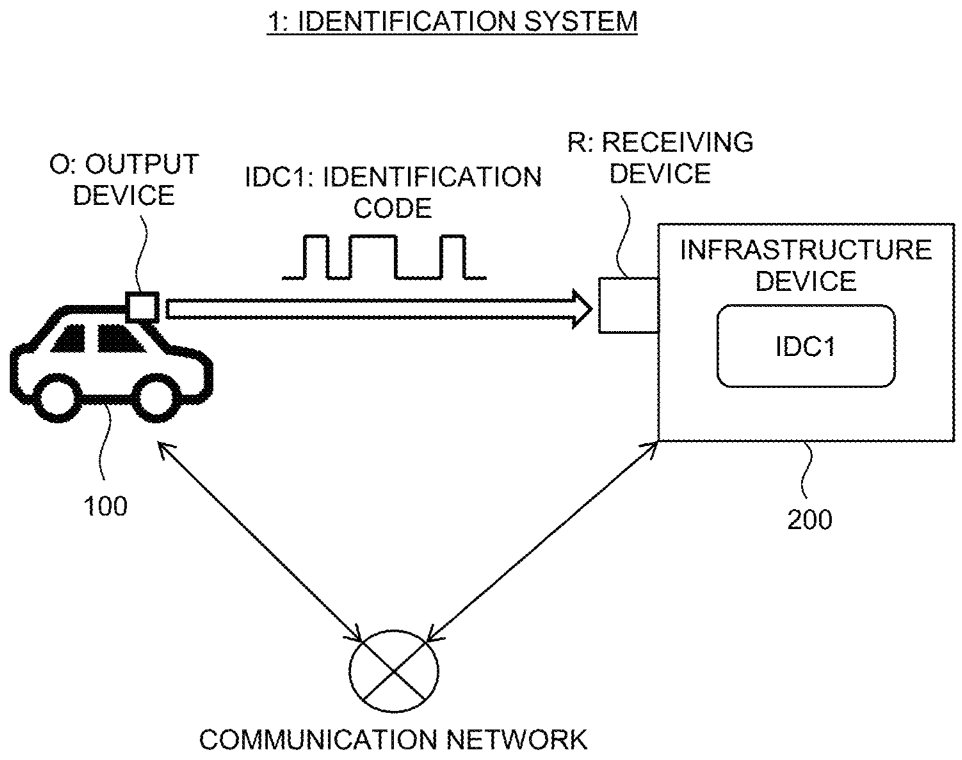
FIG. 3 is a conceptual diagram for explaining the identification system and the identification process according to a second embodiment.

FIG. 3 is a conceptual diagram for explaining the identification system 1 and the identification process according to the second embodiment. Descriptions overlapping with the first embodiment will be omitted as appropriate.

In the second embodiment, the first device 10 to be identified is the vehicle 100, and the second device 20 is the infrastructure device 200. The identification code IDC1 are identification code for identifying the vehicles 100. The identification code IDC1 may be fixed for the respective vehicles 100 (users) or may be issued temporarily. The identification code IDC1 may also serve as the authentication information for authenticating the vehicles 100.

The vehicle 100 includes the output device O, and the infrastructure device 200 includes the receiving device R. The vehicle 100 outputs the electromagnetic wave or the sound wave modulated to indicate the identification code IDC1 from the output device O. The infrastructure device 200 identifies the vehicle 100 based on the identification code IDC1 indicated by the electromagnetic wave or sound wave received via the receiving device R. Thus, the vehicle 100 can be identified without using wireless communication.

Figure 4:
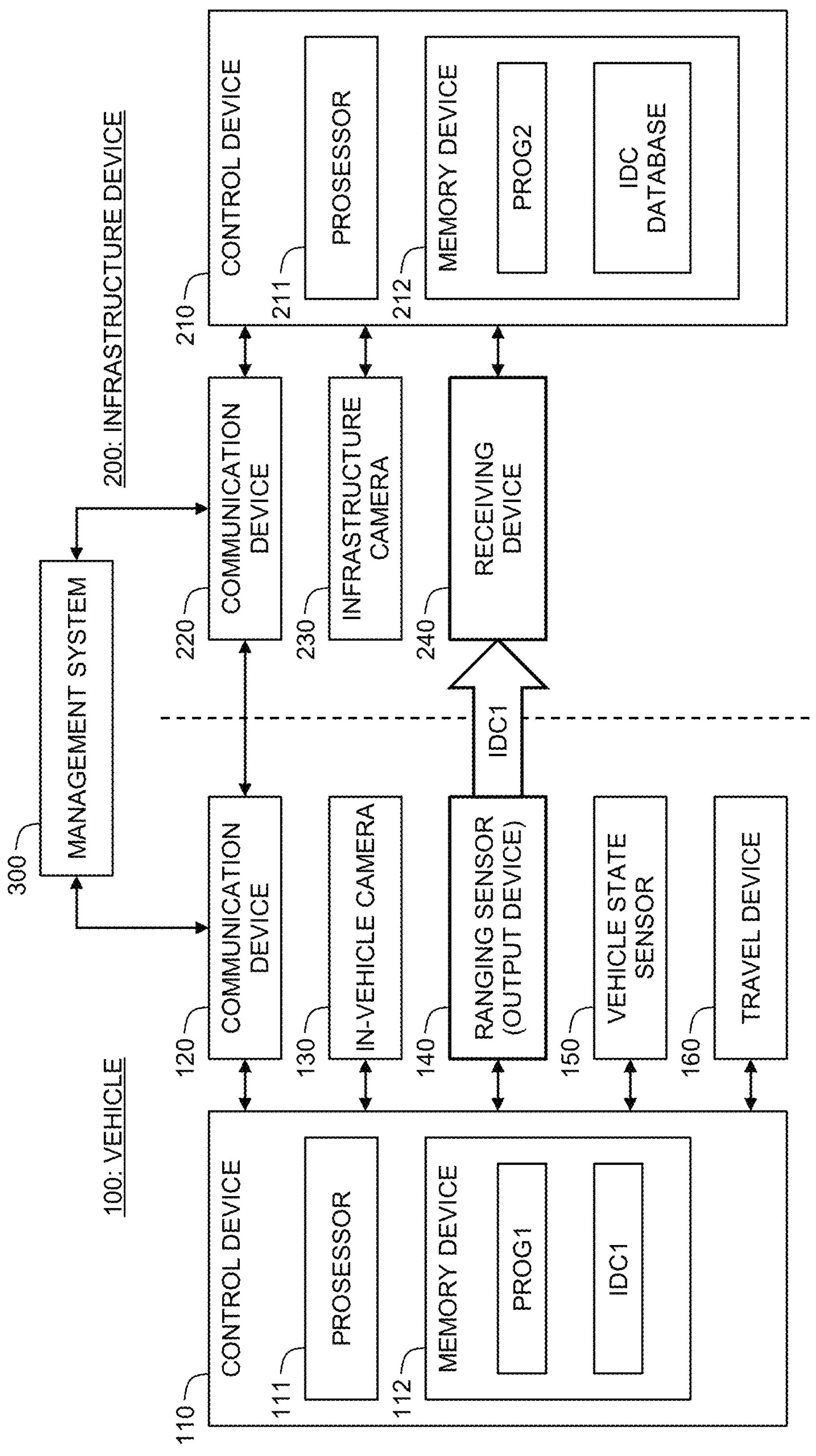
FIG. 4 is a block diagram showing an example of a configuration of the vehicle and an infrastructure device according to the second embodiment.

FIG. 4 is a block diagram showing an example of a configuration of the vehicle 100 and the infrastructure device 200 according to the second embodiment. Hereinafter, configuration examples of the vehicle 100 and the infrastructure device 200 will be described.

2-1. Configuration Example of Vehicle

The vehicle 100 includes a control device 110, a communication device 120, an in-vehicle camera 130, a ranging sensor 140, a vehicle state sensor 150, and a travel device 160.

The control device 110 is a computer that controls the vehicle 100. The control device 110 includes one or more processors 111 (hereinafter, simply referred to as a processor 111) and one or more memory devices 112 (hereinafter, simply referred to as a memory device 112). The processor 111 executes a variety of process. Examples of the processor 111 include a central processing unit (CPU), a graphics processing unit (GPU), an application specific integrated circuit (ASIC), and a field-programmable gate array (FPGA) The memory device 112 stores a variety of information. Examples of the memory device 112 include a hard disk drive (HDD), a solid state drive (SSD), a volatile memory, and a nonvolatile memory, etc.

The control program PROG1 is a computer program to control the vehicle 100. The processor 111 executing the control program PROG1 and the memory device 112 may cooperate with each other to realize the functions of the control device 110. The control program PROG1 is stored in the memory device 112. Alternatively, the control program PROG1 may be recorded on a non-transitory computer-readable recording media.

The communication device 120 performs wireless communication via a wireless communication network. For example, the communication device 120 performs wireless communication with a management system 300. The management system 300 manages the vehicle 100, the infrastructure device 200, and the predetermined area AR. The communication device 120 may perform wireless communication with the infrastructure device 200.

The in-vehicle camera 130 captures an image of a situation around the vehicle 100 and acquires the image indicating the situation around the vehicle 100.

The ranging sensor 140 outputs the electromagnetic wave or the sound wave, and receives a reflected wave thereof, thereby detecting an object in the surroundings and measuring a distance to the detected object. Examples of the ranging sensor 140 include a radar, a LIDAR, an infrared sensor, and a sonar. The ranging sensor 140 is used as the "output device O" shown in FIG. 3. That is, the ranging sensor 140 originally mounted to detect an object around the vehicle 100 is also used as the "output device O" in the identification process. Thus, additional parts and additional costs are not required.

The vehicle state sensor 150 detects a state of the vehicle 100 and acquires vehicle state information. For example, the vehicle state sensor 150 includes a speed sensor, an acceleration sensor, a yaw rate sensor, a steering angle sensor, etc.

The travel device 160 includes a steering device, a driving device, and a braking device. The steering device steers wheels. For example, the steering device includes an electric power steering (EPS) device. The driving device is a power source that generates a driving force. Examples of the driving device include an engine, an electric motor, and an in-wheel motor. The braking device generates a braking force. The control device 110 performs vehicle travel control by controlling the travel device 160 based on the vehicle state information.

The control device 110 recognizes the situation around the vehicle 100 using the in-vehicle camera 130 and the ranging sensor 140. For example, the control device 110 detects an object around the vehicle 100 and acquires object information regarding the detected object. Examples of the object around the vehicle 100 include a pedestrian, another vehicle, and an obstacle. Examples of the obstacle include a roadside structure, a wall, a building, and a utility pole. The object information indicates a relative position and a relative velocity of the object with respect to the vehicle 100.

The control device 110 may perform the vehicle travel control while grasping the situation around the vehicle 100 based on the object information. For example, the control device 110 may perform autonomous driving control. Here, the autonomous driving means that at least a part of steering, acceleration, and deceleration of the vehicle 100 is automatically performed independently of operation of a driver. As an example, autonomous driving at level 3 or higher may be performed. For example, the control device 110 generates a travel plan for traveling toward a destination and generates a target trajectory for realizing the travel plan. The target trajectory includes a target position and a target speed of the vehicle 100. Then, the control device 110 performs the vehicle travel control so that the vehicle 100 follows the target trajectory.

2-2. Configuration Example of Infrastructure Device

The infrastructure device 200 includes a control device 210, a communication device 220, an infrastructure camera 230, and a receiving device 240.

The control device 210 is a computer that controls the infrastructure device 200. The control device 210 includes one or more processors 211 (hereinafter, simply referred to as a processor 211) and one or more memory devices 212 (hereinafter, simply referred to as a memory device 212). The processor 211 executes a variety of process. Examples of the processor 211 include a CPU, a GPU, an ASIC, and an FPGA. The memory device 212 stores a variety of information. Examples of the memory device 212 include an HDD, an SSD, a volatile memory, and a nonvolatile memory.

The control program PROG2 is a computer program for controlling the infrastructure device 200. The processor 211 executing the control program PROG2 and the memory device 212 may cooperate with each other to realize the functions of the control device 210. The control program PROG2 is stored in the memory device 212. Alternatively, the control program PROG2 may be recorded on a non-transitory computer-readable recording media.

The communication device 220 communicates with the management system 300 via a communication network. The communication device 220 may perform wireless communication with the vehicle 100.

The infrastructure camera 230 is installed in the predetermined area AR. The infrastructure camera 230 may be installed at the entrance of the predetermined area AR. The infrastructure camera 230 captures an image of the situation of the predetermined area AR and acquires the image indicating the situation of the predetermined area AR. The control device 210 grasps the situation of the predetermined area AR based on the image. The control device 210 can detect the vehicle 100 based on the image.

The receiving device 240 corresponds to the "receiving device R" illustrated in FIG. 3. That is, the receiving device 240 is configured to receive the electromagnetic wave or the sound wave output from the ranging sensor 140 (output device O) of the vehicle 100. For example, when the ranging sensor 140 is a radar, the receiving device 240 includes an antenna and a receiver (Rx) for receiving a radio wave. As another example, when the ranging sensor 140 is a LIDAR, the receiving device 240 includes a photodetector (e.g., a photodiode) to receive laser light. As still another example, when the ranging sensor 140 is a sonar, the receiving device 240 may include a piezoelectric element to receives the sound wave.

2-3. Identification Process

The control device 110 of the vehicle 100 acquires in advance the identification code IDC1 for identifying the vehicle 100. For example, the management system 300 determines the identification code IDC1 of the vehicle 100 and provides the identification code IDC1 to the vehicle 100. In an environment in which wireless communication is available, the control device 110 acquires the identification code IDC1 from the management system 300 via the communication device 120 in advance. The identification code IDC1 acquired in advance are stored in the memory device 112.

The memory device 212 of the infrastructure device 200 stores an identification code database. The identification code database indicates identification code IDC1 for the respective vehicle 100. Typically, the identification code database indicates the identification code IDC1 of the respective vehicles 100 that use the predetermined area AR. The identification code database may be provided from the management system 300.

The identification process to identify the vehicle 100 is as follows. The control device 110 of the vehicle 100 controls the ranging sensor 140 to output the electromagnetic wave or the sound wave modulated to indicate the identifying code IDC1. The control device 210 of the infrastructure device 200 receives the electromagnetic wave or the sound wave output from the ranging sensor 140 via the receiving device 240. The control device 210 identifies the vehicles 100 based on the identification code IDC1 indicated by the received electromagnetic wave or sound wave. For example, the control device 210 compares the received identification code IDC1 with the identification codes IDC1 registered in the IDC database to identify the vehicles 100.

2-4. Effect

According to the present embodiment, it is possible to identify vehicle 100 without using wireless communication. Further, since the ranging sensor 140 originally mounted on the vehicle 100 is also used as the output device O, additional components and additional cost are not required.

3. Third Embodiment

Figure 5:
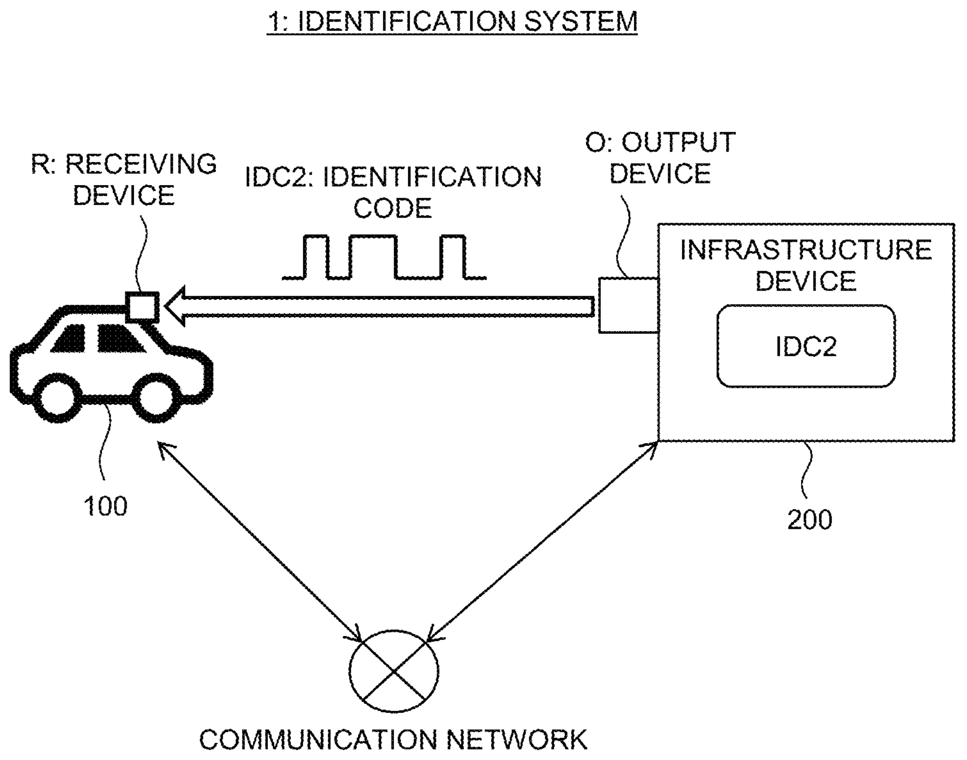
FIG. 5 is a conceptual diagram for explaining the identification system and the identification process according to a third embodiment.

FIG. 5 is a conceptual diagram for explaining the identification system 1 and the identification process according to a third embodiment. Descriptions overlapping with the first and second embodiments will be omitted as appropriate.

In the third embodiment, the first device 10 to be identified is the infrastructure device 200, and the second device 20 is the vehicle 100. The vehicle 100 identifies the predetermined area AR in order to check whether the predetermined area AR is an area available for the vehicle 100. Note that "identifying the predetermined area AR" and "identifying the infrastructure device 200 associated with the predetermined area AR" are equivalent. The identification code IDC2 are identification codes for confirming whether the predetermined areas AR are areas available for the vehicles 100. The identification code IDC2 may be fixed for the respective predetermined area AR (infrastructure device 200) or may be issued temporarily.

The infrastructure device 200 includes an output device O, and the vehicle 100 includes a receiving device R. The infrastructure device 200 outputs the electromagnetic wave or the sound wave modulated to indicate the identification code IDC2 from the output device O. The vehicle 100 identify the infrastructure device 200 based on the identification code IDC2 indicated by the electromagnetic wave or the sound wave received via the receiving device R. This makes it possible to identify the infrastructure device 200 without using wireless communication.

Figure 6:
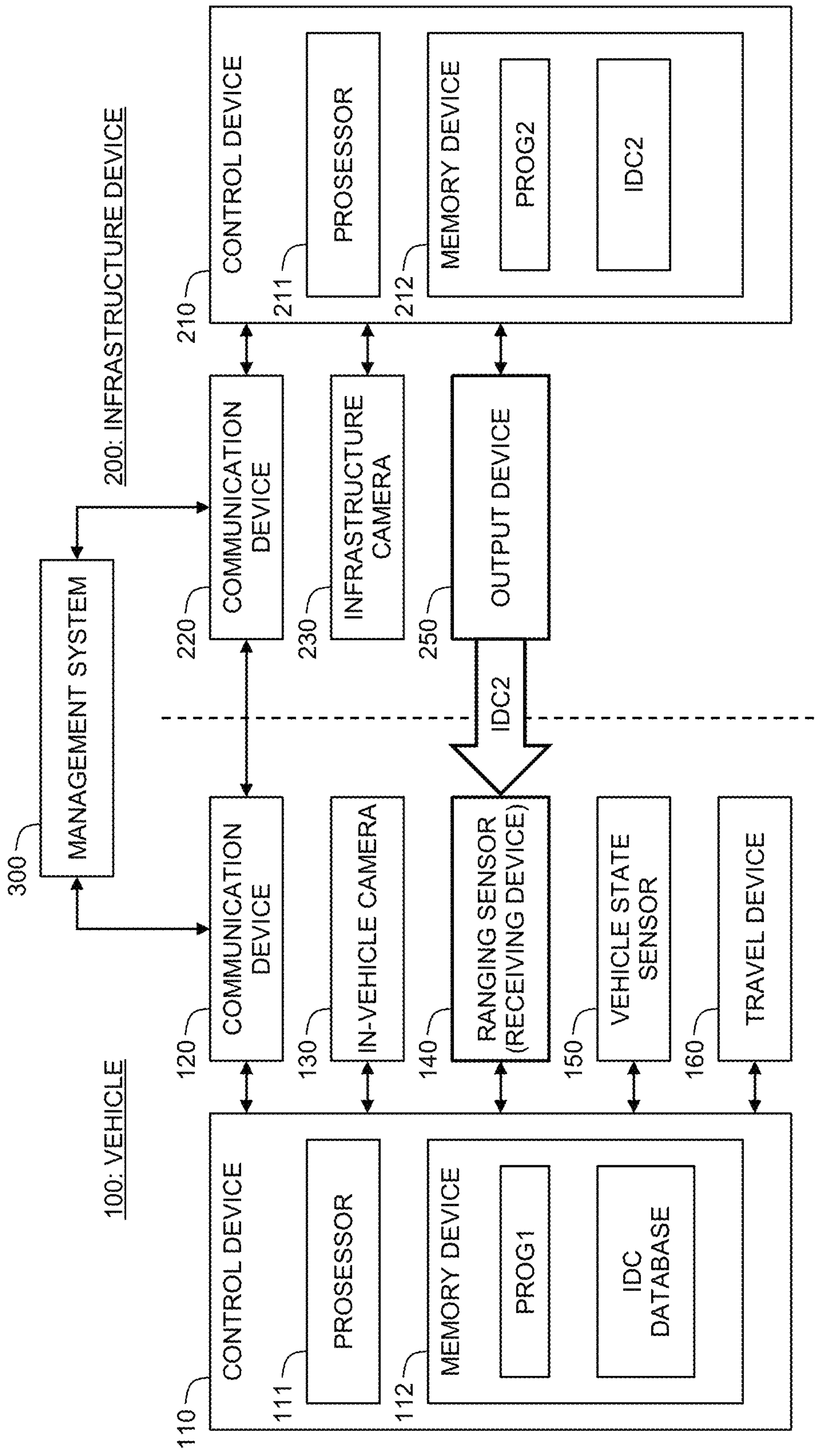
FIG. 6 is a block diagram showing an example of the configuration of the vehicle and the infrastructure device according to the third embodiment.

FIG. 6 is a block diagram showing an example of the configuration of the vehicle 100 and the infrastructure device 200 according to the third embodiment. Descriptions overlapping with the description in the second embodiment will be omitted.

The ranging sensor 140 mounted on the vehicle 100 is used as the "receiving device R" shown in FIG. 5. That is, the ranging sensor 140 originally mounted to detect objects around the vehicle 100 is also used as the "receiving device R" in the identification process. Thus, additional parts and additional costs are not required.

The infrastructure device 200 includes an output device 250. The output device 250 corresponds to the "output device O" illustrated in FIG. 5. The output device 250 outputs an electromagnetic wave or a sound wave that can be received by the ranging sensor 140 of the vehicle 100.

The control device 210 of the infrastructure device 200 acquires the identification code IDC2 of the infrastructure device 200 in advance. For example, the management system 300 determines the identifying code IDC2 of the infrastructure device 200 and provides the identifying code IDC2 to the infrastructure device 200. The control device 210 acquires the identification code IDC2 from the management system 300 via the communication device 220 in advance. The identification code IDC2 acquired in advance are stored in the memory device 212.

The memory device 112 of the vehicle 100 stores an identification code database. The identification code database indicates the identification code IDC2 for each of the infrastructure device 200. The identification code database may be provided from the management system 300.

The identification process for identifying the infrastructure device 200 is as follows. The control device 210 of the infrastructure device 200 controls the output device 250 to output the electromagnetic wave or the sound wave modulated to indicate the identifying code IDC2. The control device 110 of the vehicle 100 receives the electromagnetic wave or the sound wave output from the output device 250 via the ranging sensor 140. The control device 110 identifies the infrastructure device 200 based on the identification code IDC2 indicated by the received electromagnetic wave or sound wave. For example, the control device 110 compares the received identification code IDC2 with the identification code IDC2 registered in the IDC database to identify the infrastructure device 200.

According to the present embodiment, it is possible to identify the infrastructure device 200 without using wireless communication. Further, since the ranging sensor 140 originally mounted on the vehicle 100 is also used as the receiving device R, additional components and additional cost are not required.

What is claimed is:

1. An identification system comprising:

a vehicle; and an infrastructure device installed in a predetermined area, wherein a first device that is the vehicle, the first device includes an output device configured to output an electromagnetic wave or a sound wave that is not for wireless communication, the output device is a ranging sensor including one of a radar, LIDAR, an infrared sensor, and a sonar, a second device that is the infrastructure device, the second device includes a receiving device configured to receive the electromagnetic wave or the sound wave output from the output device of the first device, the first device is configured to output the electromagnetic wave or the sound wave modulated to indicate an identification code of the first device from the output device, without performing wireless communication with the second device, and the second device is configured to identify the first device based on the identification code indicated by the electromagnetic wave or the sound wave received via the receiving device, without performing wireless communication with the first device.

2. The identification system according to claim 1, wherein the electromagnetic wave is other than visible light, and the sound wave is an ultrasonic wave.

3. The identification system according to claim 1, wherein the second device is configured to hold the identification code in advance, and to identify the first device based on the identification code indicated by the received electromagnetic wave or sound wave and the held identification code.

4. The identification system according to claim 1, wherein the vehicle is configured to:

detect an object in a surrounding of the vehicle using the ranging sensor; and control the vehicle based on a result of the detection of the object.

5. The identification system according to claim 1 further comprising a management system configure to:

determine the identification code, which is issued temporarily, and provide the identification code to the first device.

6. The identification system according to claim 5, wherein the management system is further configured to provide an identification code database to the second device, wherein the identification code database includes the identification code provided to the first device.

* * * * *